United States Patent [19]

Clarke et al.

[11] 4,434,427
[45] Feb. 28, 1984

[54] ATMOSPHERE CONTROL FOR PHOTOGRAPHIC PIPELINE INSPECTION

[75] Inventors: Frederick Clarke, Houston, Tex.; Donald E. Lorenzi, Des Plaines, Ill.; Edward F. Schaefer, Tulsa, Okla.

[73] Assignee: Magnaflux Corporation, Chicago, Ill.

[21] Appl. No.: 337,117

[22] Filed: Jan. 5, 1982

[51] Int. Cl.³ .................. G03B 37/00; G01D 9/38
[52] U.S. Cl. ................................ 346/33 P; 354/63
[58] Field of Search ................... 354/63; 346/33 P

[56] References Cited

U.S. PATENT DOCUMENTS

| 2,737,864 | 3/1956 | Gutterman et al. | 354/63 |
| 2,909,975 | 10/1959 | Ulrich | 354/63 |
| 2,932,243 | 4/1960 | Woronoff | 354/63 |
| 2,971,259 | 2/1961 | Hahnau et al. | 354/63 X |
| 3,096,698 | 7/1963 | Stoutenburg | 354/63 |
| 3,667,359 | 6/1972 | Watts et al. | 354/63 |
| 3,828,356 | 8/1974 | Wiers | 346/33 P X |
| 4,249,810 | 2/1981 | O'Connor et al. | 354/63 |
| 4,372,658 | 2/1983 | O'Connor et al. | 354/63 |

FOREIGN PATENT DOCUMENTS 751694 7/1956 United Kingdom .
397638 1/1974 U.S.S.R. .

OTHER PUBLICATIONS

Jan. 1981, Pipeline Industry Camera Pig: New Development for In-service Line Inspection.
Mar. 1981, Pipeline & Gas Journal 'Camera Pig' Checks Weldments, Internal Coating Offshore.
May 1981, Quality Pig in a Pipeline.

Primary Examiner—Donald A. Griffin
Attorney, Agent, or Firm—Neuman, Williams, Anderson & Olson

[57] ABSTRACT

A device is disclosed which includes a camera pig and a tow pig having an articulated connection therebetween to permit movement through pipe bends. The tow pig includes a syphon device for projecting liquids upwardly and forwardly and also includes a compressor and a desiccant chamber for drying of gas which is injected into a camera space between cups of the camera pig. A flow path is provided through the camera pig which by-passes the camera space, for maintaining a passive environment therein.

18 Claims, 5 Drawing Figures

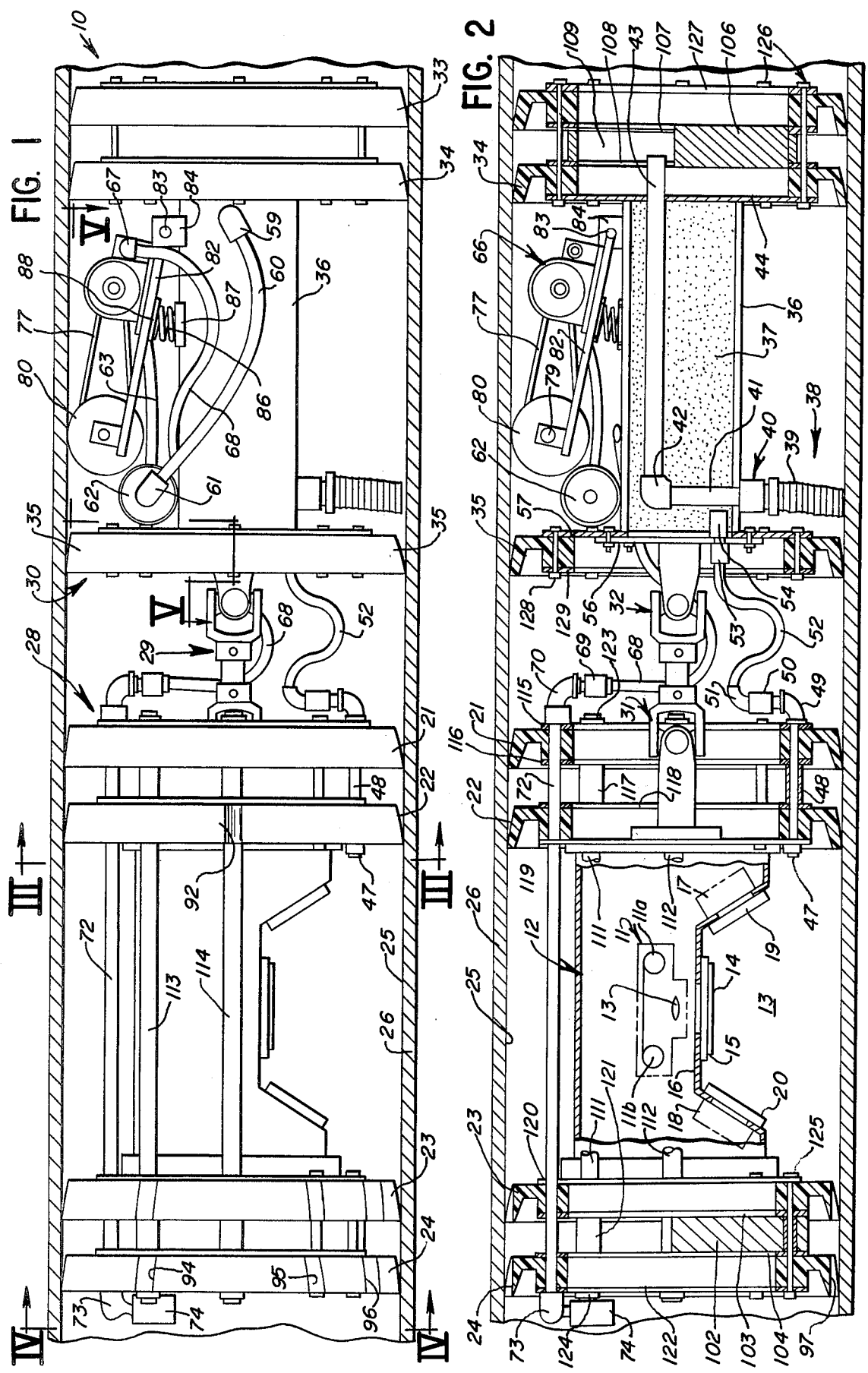

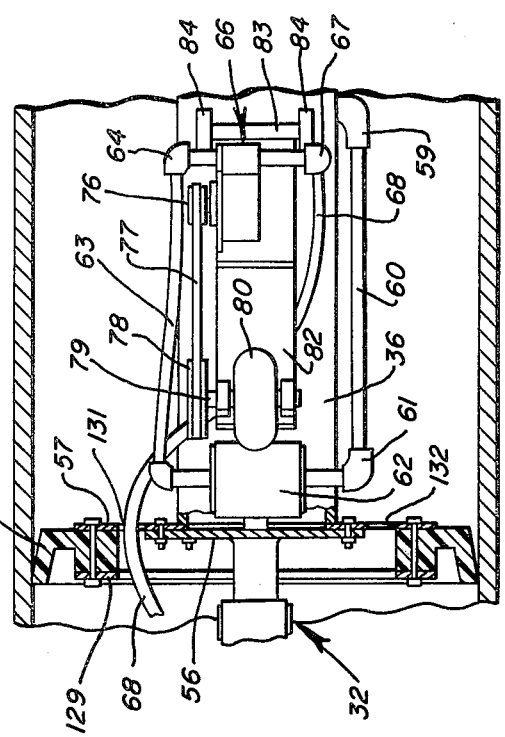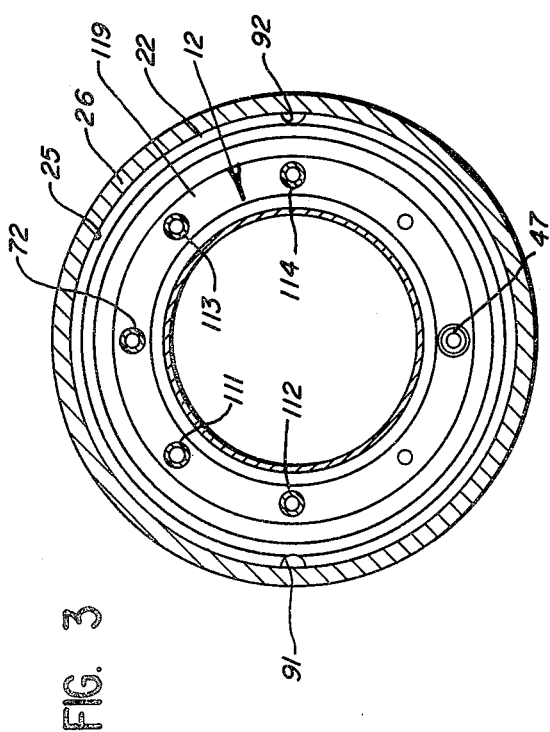

ATMOSPHERE CONTROL FOR PHOTOGRAPHIC PIPELINE INSPECTION

This invention relates to the control of atmosphere in photographic pipeline inspection and more particularly, to the control of atmosphere in a manner such as to allow operation under adverse conditions which can occur within a pipeline and yet obtain photographs which accurately portray the condition of the pipeline walls. A device is provided which is the result of extensive testing under actual pipeline conditions and it embodies a combination of features which cooperate to make it possible to obtain highly accurate and reliable results.

BACKGROUND OF THE INVENTION

A photographic apparatus has heretofore been developed for obtaining a record of the interior condition of a pipeline and has been found to be highly advantageous, especially in connection with the testing of pipelines used for transporting natural gas in its raw state. Natural gas may contain coarse solids, plus other gases and liquids which may combine to form corrosives. For example, the gas may include a combination of carbon dioxide and free water which is operative to produce carbonic acid and to corrode steel. The corrosive effect can be augmented by an erosion effect when the rate of flow is high and at bends and overweld beads or the like where the flow is turbulent.

Such corrosion and erosion as well as other defects can eventually lead to complete failure of the pipe but if detected at an early time, it is possible to effect repair or to otherwise take corrective measures. For example, it is possible to move devices known as "pigs" through a pipe and by moving a series of such pigs through a pipe, it can be cleaned, etched, washed, dehydrated and then coated with a protective coating such as an epoxy.

In the apparatus heretofore developed, an image is projected to a film plane from an illuminated internal surface area of the pipe along a viewing axis which is normal to the axis of the pipe, a generally rectangular image being produced in the film plane which corresponds to a generally rectangular internal surface area of the pipe. It is possible to obtain a photographic record which can be accurately interpreted and which indicates when repair or maintenance procedures are necessary. Preferably, the camera and associated illumination means are located within a chamber between forward and rearward cup assemblies in a device which is moved through the pipeline by the pressure of fluid within the pipeline.

Another feature of the device as heretofore developed is in the provision of weight means such that the orientation of the viewing axis may be fixed relative to a vertical position. Normally, it is desirable to place the viewing axis at a "six o'clock" position because it is found that the areas of primary interest are those in the lower side of the pipe where water might accumulate to lead to corrosion of the pipe.

The device as heretofore developed has produced highly satisfactory results in a number of testing operations but has had limitations with respect to testing of pipelines in which there is an excessive amount of water or in which conditions are otherwise adverse. The accumulation of moisture in a liquid form in the lower side of the pipeline is particularly troublesome in that it may obscure the images of corrosion or other defects of the pipeline. In some cases, moisture may be carried in the gaseous medium in the pipeline to cause a fog effect. Both of such conditions are such that they may sometimes escape detection in the photographs themselves, being sometimes operative to develop photographs of a generally uniform nature which are similar to those produced when the surface within the pipeline is smooth with no defects therein.

SUMMARY OF THE INVENTION

This invention was evolved with the general object of seeking to insure that the photographic records obtained through photographic pipeline inspection apparatus such as heretofore developed are as accurate and as reliable as possible.

In accordance with the invention, a photographic pipeline inspection device is provided having a combination of features which cooperate to make it possible to operate under adverse conditions which can frequently occur within the pipeline and yet obtain photographs which accurately portray the condition of the pipeline walls, especially on the lower side where corrosion is most apt to occur. The device of the invention is particularly advantageous in that it can move through puddles of liquid within a pipeline and yet obtain a clear photograph of the lower upwardly facing surface of the pipeline wall.

In a device constructed in accordance with the invention, a camera and illumination means, preferably a pair of flashlamps, are mounted in a casing which may preferably withstand very high pressures, up to 1600 psi for example, to be substantially explosion-proof. The camera and illumination assembly is mounted in a camera chamber between two of a series of longitudinally spaced resilient cups, the peripheries of which are in sliding engagement with the inside surface of the pipe to support the device for movement therewithin. Preferably, an articulated device is provided including a camera "pig" in which the camera and illumination assembly is provided and a forward tow "pig" having a rearward end connected to the forward end of the camera pig through a pair of universal joints which allow the device to move through 90 degree pipeline bends. The tow pig includes one or more cups on its forward end which provide a substantially impervious barrier to flow therethrough and which are the active cups, operative to tow the device along a pipeline from the pressure of the gaseous medium being transported through the pipeline.

When the device encounters a puddle of liquid at a low spot in a pipeline, the cups perform an important function in distributing the liquid, tending to produce a relatively thin film over the internal surface of the pipeline. This effect is augmented through the provision of a liquid flow control such that any liquid which might tend to accumulate in the lower side of the pipeline behind the active tow cups is pumped out in a manner such that it does not reach the lower side of the camera chamber. Preferably, a "syphon" device is provided which is operative in response to the pressure differential on opposite sides of the active cups, the device defining a flow path from an inlet end at the lower rearward end of a buffer chamber behind the active cups to an outlet end at the forward end of the device. Any liquid accumulating adjacent the inlet end is forced upwardly and then forwardly and the overall result is that the device will move through and over accumulated liquid while limiting the thickness of any liquid film over the lower upwardly facing surface of the pipe in the camera chamber.

This arrangement, however, does not remove any moisture carried by the gaseous medium in the pipeline and, to some extent, may enhance the formation of a fogging condition in the camera chamber.

Another important feature of the device is in the provision of a flow path to the camera chamber including a chamber having a moisture-removing material therein and a cup for inducing flow through the flow path, a dry gas being caused to flow into the camera chamber to prevent fog therein. In addition, filter means are provided in the flow path for removing debris, enhancing the removal of moisture and protecting the pump or compressor.

Additional features relate to the construction of the device in a manner that it is very rugged and capable of withstanding the adverse environmental conditions which exist within pipelines and which, at the same time, is highly reliable in operation. Preferably, the moisture-removing material may be in the form of a desiccant disposed in a chamber within a cylindrical tube which forms a central frame member of the tow pig. The tow pig is weighted so as to place the syphon inlet at the lower surface of the pipe, the camera pig being similarly weighted to place the viewing axis at the six o'clock position. The pump or compressor may preferably be driven from a roller frictionally engaged with the upper inside surface of the pipe.

Another important feature relates to the provision of slots at certain locations in certain of the cups in order to minimize the thickness of any liquid film developed at the lower side of the camera chamber. In accordance with a specific feature, the cup at the forward end of the camera chamber is formed with one or more slots which are spaced a substantial distance upwardly from the lower side, at positions such that any liquid which accumulates forwardly therefrom is caused to flow, relative to the device, in a path spaced upwardly from the lower area of the pipe surface which is photographed. Preferably, two slots may be provided at approximately three o'clock and nine o'clock positions. The cup or cups which are behind the camera chamber may be provided with a substantial number of slots, preferably including relatively wide slots at the lower end, to minimize the possibility of accumulation of liquid in front thereof, within the camera chamber.

This invention contemplates other objects, features and advantages which will become more fully apparent from the following detailed description taken in conjunction with the accompanying drawings.

BRIEF DESCRIPTION OF THE DRAWINGS

FIG. 1 is a side elevational view of a pipeline inspection device constructed in accordance with the invention, shown in position in a pipe;

FIG. 2 is an elevational sectional view of the device of FIG. 1;

FIG. 3 is a sectional view taken substantially along line III—III of FIG. 1;

FIG. 4 is a sectional view taken substantially along line IV—IV of FIG. 1 and constituting a rear elevational view of the device; and FIG. 5 is a sectional view taken substantially along line V—V of FIG. 1 and providing a top plan view of a forward tow pig portion of the device.

DESCRIPTION OF A PREFERRED EMBODIMENT

Reference numeral 10 generally designates a photographic pipeline inspection device constructed in accordance with the principles of the invention. The device 10 is designed to be launched into a pipeline used for transport of natural gas and to be moved through the pipeline by the pressure of the gas which may, for example, be on the order of 850 psi. While the device travels through the pipeline, a series of photographs are taken of the internal surface of the pipe. As shown diagrammatically in FIG. 2, a camera 11 is mounted in a housing 12 and it includes film supply and take-up reels 11a and 11b, a lens 13 disposed above a protective glass plate 14 which is held by a support 15 on a horizontal wall portion 16 of the housing 12. The surface of the pipe is illuminated by a pair of strobe lights 17 and 18 which are disposed behind a pair of ports 19 and 20 on inclined wall portions of the housing 12, the ports 19 and 20 having glass windows for transmission of light therethrough.

The housing 12 is supported between two forward cups 21 and 22 and two rearward cups 23 and 24, the cups 21-24 being of a resilient elastomeric material and having annular peripheral flange portions for sliding engagement with the inside surface 25 of a pipe 26 in which the device is moved. The camera housing 12 together with the cups 21-24 and connecting structures form a camera pig generally designated by reference numeral 28 which is connected through an articulated connection 29 to the rearward end of a tow pig generally designated by reference numeral 30. The articulated connection 29 includes two universal joint assemblies 31 and 32 and is designed to allow the device to move through right angle pipe bends.

The tow pig 30 includes two forward cups 33 and 34 and one rearward cup 35. The forward cups 33 and 34 are active cups in that they substantially block fluid flow therethrough so that the device is propelled by the pressure differential between the gaseous fluid behind the cup 34 and the gaseous fluid in front of the device. The arrangement is such that there is fluid communication from the rear of the device 10 to the space behind the cup 34.

The tow pig 30 includes a tubular member 36 which forms a central body member thereof between the forward active cups 33 and 34 and the rearward cup 35. The tubular member 36 also defines a chamber for receiving a moisture-removing material 37 which may preferably be an activated alumina desiccant or silica gel or equivalent for an injection system used for injecting dry gas into the camera chamber. The member 36 also supports a syphon device which is generally indicated by reference numeral 38. The syphon device 38 includes a member 39 of flexible tubing, the lower end of which rides on the surface of the pipe 26 at the lower rearward end of a buffer chamber between the cups 34 and 35. The upper end of the member 39 is connected through a suitable coupling 40 to the lower end of a pipe 41, the upper end of which is connected through a right angle elbow 42 to the rearward end of a pipe 43, the forward end of which extends through a plate 44 which is welded to the forward end of the tube 36 and which is connected to the cups 33 and 34. In operation, if any liquid should accumulate in the buffer zone between the cups 34 and 35 it will be forced into the lower end of the member 39 and upwardly and forwardly through the pipes 41 and 43 to exit forwardly out of the forward end of the device, it being noted that there is a differential pressure between the space on the rearward side of the forward active cups 33 and 34 and the space on the forward side thereof.

The interior of the tubular member 36, which forms a chamber for the desiccant 37, is in a fluid flow path which has an outlet at the lower forward end of the camera chamber. The outlet is formed by the rearward end 47 of a pipe 48 which extends through the cups 22 and 21, the forward end of the pipe 48 being connected through elbow 49 to a disconnect 50. Disconnect 50 is connected through an elbow 51 and a flexible hose 52 to a fitting 53 which is connected to a filter 54 within the desiccant chamber 37, through an opening in a plate 56. Plate 56 is detachably bolted to a plate 57 which is welded to the rearward end of the tubular member 36 and which is connected to the cup 35. Plate 56 may be detached to provide access to the desiccant chamber, for replacement of the desiccant 37 and for cleaning of the filter 54. The forward end of the front U-joint 32 may be welded or otherwise secured to the plate 56.

Gas under pressure is supplied to the forward end of the chamber within member 36 through an elbow fitting 59 connected to the forward end of a hose 60, the rearward end of which is connected through an elbow fitting 61 to the outlet end of a filter 62. The inlet end of the filter 62 is connected through a hose 63 and through an elbow fitting 64 to the outlet of a compressor 66. The inlet of the compressor 66 is connected through an elbow 67 to the forward end of a hose 68 which extends through an opening in the plate 57 and into the space between the tow and camera pigs, the rearward end of the hose 68 being connected through a disconnect 69 and through an elbow fitting 70 to the forward end of a pipe 72. The pipe 72 extends through all four cups 21–24 of the camera pig to a rearward end which is connected through an elbow 73 to a filter 74 forming a gas inlet.

Thus, the fluid flow path is thus through filter 74, elbow 73, pipe 72, elbow 70, disconnect 69, hose 68, elbow 67, compressor 66, elbow 64, hose 63, filter 62, elbow 61, hose 60, elbow 59, the chamber within member 36, filter 54, fitting 53, hose 52, elbow 51, disconnect 50, elbow 49, and pipe 48 to the outlet end 47 at the lower forward end of the camera chamber.

The filters 54, 62, and 74 may be inactive filters but, in addition to desiccant 37, suitable active filtering means may be provided and, although coalescing action takes place in filters 54, 62, and 74, it is also desirable in some cases to include a suitable coalescing material in the flow path. For example, a borosilicate epoxy bonded filter may be incorporated in the flow path in place of or in addition to the illustrated filters 54, 62, and 74. The filter 62 between the outlet of the compressor 66 and the inlet to the desiccant chamber is particularly important in that back flow may sometimes occur to cause the desiccant material to enter the compressor and cause damage thereto, the desiccant material being highly abrasive. By locating desiccant chamber in the outlet side of the chamber and by using the filter 62, such problems may be obviated.

To drive the compressor 66, a pulley 76 is secured to its drive shaft and is connected through a belt 77 to a pulley 78 on a shaft 79 which carries a roller 80 frictionally engaged with the upper inside surface of the pipe 26. The compressor 66 and support bearings for the shaft 79 are carried by a support plate 82 which is affixed to a shaft 83, the opposite ends of which are journalled in blocks 84 which are welded or otherwise secured to the tubular member 36. A coiled compression spring 86 acts between seating members 87 and 88 on the member 36 and support plate 82, to urge the roller 80 into frictional engagement with the inside surface of the plate 26.

As shown in FIG. 3, the cup 22 at the forward end of the camera chamber is formed with a pair of slots 91 and 92 in the peripheral flange portion thereof, at three o'clock and nine o'clock positions. These slots are provided in case any liquid should get past the rearward cup 35 of the tow pig 30 to accumulate in the space ahead of the cup 22. When any such liquid rises to the level of the slots 91 and 92, it may move rearwardly, relative to the device 10, along paths which are higher than the lower surface area of the pipe which is photographed. In this connection, it is noted that the device may move at a relatively high velocity, for example, six feet per second. The rearward cups 23 and 24 are desirably provided with a plurality of slots such as to permit free flow of liquid therethrough, relative to the device 10. As shown in FIG. 4, the rear cup 24 has slots 93, 94, 95, 96, 97, 98, 99 and 100, respectively, disposed at twelve o'clock, two o'clock, four o'clock, five o'clock, six o'clock, seven o'clock, eight o'clock and ten o'clock positions. The slots 96, 97 and 98 at the five o'clock, six o'clock and seven o'clock positions are relatively wide. The cup 23 is desirably provided with slots which are the same as those of the cup 24 and with such slots, the possibility of accumulation of liquid within the camera space is substantially obviated.

It is highly desirable that the various parts of the device be maintained in the orientation as illustrated, with the viewing axis of the camera being vertical and extending downwardly for photographing the lower inside surface of the pipe in which defects are apt to occur. It is also important that the lower end of the syphon tube be located at the lowermost position and the drive roller 80 for the compressor is desirably engaged with the upper inside surface of the pipe. To obtain the proper orientation, a weight 102 is disposed in the camera pig 28, between plates 103 and 104 which are respectively engaged with the rearward and forward sides of the cups 23 and 24. A similar weight 106 is disposed in the tow pig 30, between plates 107 and 108 which are respectively engaged with the rearward and forward sides of the cups 33 and 34, a spacer ring 109 being disposed around the weight 106 and between the plates 107 and 108.

An important feature is in the provision of one or more paths for flow of the gaseous medium forwardly through the camera pig 28, bypassing the camera chamber, for the purpose of supplying the flow requirements of the syphon device 38 and any flow which may occur past the active cups 33 and 34. The result is that no flow is produced through the camera chamber which might interfere with the flow of dry gas into the camera chamber from the outlet end 47 of the pipe 48. Thus, a passive environment is maintained in the camera chamber, with a clear atmosphere therein.

In the illustrated embodiment, four pipes 111, 112, 113 and 114 are provided which permit free flow of the gaseous medium forwardly from the rearward end of the camera pig 28 to the forward end thereof. The pipes 111–114 also serve as structural members to assist in holding the components of the camera pig together. Thus, for example, the pipe 111 extends through a ring 115 on the forward side of the cup 21, thence through the cup 21, thence through a ring 116, thence through a spacer sleeve 117, thence through a ring 118, cup 22 and a ring 119, then along the camera housing 12, then through a ring 120, cup 23 and ring 103, then through a spacer sleeve 121 and then through a ring 104, cup 24, and a ring 122 on the rear side of the cup 24. Suitable nuts 123 and 124 may be threaded on the forward and rearward ends of the pipe 111. The other pipes 112, 113 and 114 function in a similar fashion with nuts being threaded on the opposite ends thereof.

It is noted that the pipe 48 and the pipe 72 also serve as structural frame members and, in addition, suitable bolts such as the bolt 125 shown at the lower left, may be provided.

In the construction of the tow pig a series of bolts 126 extend through a plate 127 on the forward side of the cup 33, then through cup 33, ring 107, ring 108, cup 34 and plate 44. At the rear, a series of bolts 128 extend through the plate 57, cup 35 and a ring 129 on the rear side of cup 35. It is noted that the plate 57 has relatively large openings 131 and 132 therethrough (FIG. 5) which permit free flow of gas to the syphon device 38. Hose 68 extends through the opening 131.

The combination of features as illustrated and described is highly advantageous in obtaining control such as to obtain a clear atmosphere within the camera chamber and no more than a very thin film of liquid on the lower surface of the pipe which is photographed. The provision of an active cup or cups at the forward end is important in combination with the cup or cups positioned between the active cup or cups and the cup in front of the camera chamber in providing one or more buffer zones wherein liquid may accumulate and be dealt with in a manner such as not to accumulate on the pipe surface which is photographed. In the illustrated arrangement, a buffer zone is provided between cups 34 and 35 from which the liquid is elevated and ejected forwardly. It is noted that in addition to atmospheric control, the forward ejection of fluid is advantageous in obtaining better lubrication of the pipe walls and a smoother movement of the device with less wear on the cups. The provision of an articulated connection with double U-joints is advantageous in allowing the device to be of substantial length and still negotiate right angle pipe bends, as is necessary for launching purposes.

The arrangement as discussed hereinbefore in which the fluid may bypass the camera chamber is also advantageous in insuring the development of a passive environment in the camera chamber and a clear atmosphere. The various features of the system used for supplying dry gas to the camera chamber are also important and are particularly advantageous in combination with the liquid control arrangement. Thus, for example, the tow pig not only serves to develop buffer zones but also provides a large volume chamber for the desiccant 37 as well as a support for the compressor 66 and associated drive mechanism. With the flexible hoses 52 and 68, the necessary connections are provided while, at the same time, the device can negotiate sharp bends in the pipeline.

The construction also permits the use of other features which may be desirably incorporated. The housing 12 may enclose not only the camera 11 and flashlamps 17 and 18 but also control circuitry for control such that photographs will be taken only at selected locations at which defects are likely to occur as well as at programmed time or distance intervals. Suitable magnetic or other defect detecting means as well as weld sensors may be readily attached to the device and it is also noted that an optical port wiper may be provided for clearing the window 14.

It will be understood that modifications and variations may be effected without departing from the spirit and scope of the novel concepts of this invention.

We claim:

1. A pipe inspection device arranged for longitudinal movement within a generally horizontal pipe and comprising: a frame structure, a plurality of longitudinally spaced resilient cup means on said frame structure having annular peripheral portions for sliding engagement with longitudinally spaced internal surface portions of the pipe to support said device for movement within the pipe, weight means on said frame structure providing a center of gravity spaced radially outwardly from a central longitudinal axis for gravitationally placing said frame structure at a certain angular position when moved through a horizontal pipe, photographic camera means disposed on said frame structure in a camera space behind a first one of said cup means and in front of a second one of said cup means, said camera means including means defining an image area, film storage and transport means arranged for feeding film through said image area and optical means for projecting an image to said image area along an axis which is substantially vertical when said frame structure is at said certain angular position and for producing an image in said image area corresponding to an upwardly facing internal lower surface area of a horizontal pipe, illumination means for illuminating said surface area, liquid flow control means for operating during movement through any accumulation of liquid in the pipe to effect upward movement of the liquid, said liquid flow control means and said plurality of cup means cooperating to allow said device to pass under the major portion of the liquid of any such accumulation and to produce no more than a thin film of liquid over said lower internal surface area within said camera space, means defining a flow path for flow of a gaseous medium within the pipe from a region outside said camera chamber to said camera space, and means defining a chamber in said flow path filled with a moisture-removing material for producing a supply of dry gas to said camera space at a rate such as to produce a clear atmosphere therein.

2. In apparatus as defined in claim 1, said plurality of cup means including active cup means positioned forwardly in relation to said first one of said cup means and effective to substantially prevent forward flow from the rearward side thereof to the forward side thereof to propel said device along the pipe in response to fluid pressure in the pipe.

3. In a device as defined in claim 2, said liquid flow control means being effective with respect to any accumulation of liquid in a buffer zone between said active cup means and said first one of said first cup means.

4. In a device as defined in claim 3, said liquid flow control means comprising a syphon device having an inlet at a lower end of said buffer zone and having an elevated outlet for projecting liquid forwardly with respect to said active cup means, said syphon device being activated by the fluid pressure differential on opposite sides of said active cup means.

5. In a device as defined in claim 4, including a camera pig supporting said camera and illumination means and supported by said first and said second ones of said cup means, said device further including a tow pig including said active cup means on the rearward portion thereof, and an articulated connection between said camera and tow pigs for permitting said device to move through pipe bends.

6. In a device as defined in claim 5, said tow pig including a tubular member between said active and rear cup means and defining said chamber in said flow path filled with a moisture-removing material.

7. In a device as defined in claim 6, a compressor supported on said tubular member and operative to reduce flow in said flow path, and means for driving said compressor.

8. In a device as defined in claim 7, said compressor drive means including a roller frictionally engaged with the internal surface of the pipe.

9. In a device as defined in claim 6, said flow path defining means including an outlet in a lower rearward side of said first one of said cup means and a flexible hose connection between said outlet and said chamber and between said camera and tow pigs.

10. In a device as defined in claim 9, said flow path-defining means further including a conduit extending through said camera pig and having an inlet on the rearward side of said camera pig and outlet on the forward side thereof, further including a flexible hose connection positioned between said camera and tow pigs.

11. In a device as defined in claim 5, said tow pig including weight means providing a center of gravity spaced radially outwardly from a central longitudinal axis for gravitationally placing said tow pig at a certain angular position when moved through a horizontal pipe.

12. In a device as defined in claim 1, said liquid flow control means including slot means in the periphery of said first one of said cup means and disposed in upwardly spaced relation to said upwardly facing internal lower pipe surface area to divert liquid to a position above said surface area during movement of said device through a horizontal pipe at above a certain velocity.

13. In a device as defined in claim 12, said second one of said cup means including slot means in the lower periphery thereof for preventing accumulation of liquid in said camera space.

14. In a device as defined in claim 1, said plurality of cup means including active cup means effective to substantially prevent forward flow from the rearward side thereof to the forward side thereof to propel said device along the pipe in response to fluid pressure in the pipe.

15. In a device as defined in claim 14, said liquid flow control means comprising a syphon device having an inlet at a lower position and at a point behind said active cup means and having an elevated outlet for projecting fluid forwardly with respect to said active cup means, said syphon device being activated by the fluid pressure differential on opposite sides of active cup means.

16. In a device as defined in claim 15, said inlet of said syphon device being in a buffer zone between said active cup means and said first one of said cup means, and by-pass passageway means for fluid flow from the rear of said device to said buffer zone by-passing said camera space.

17. In a device as defined in claim 1, said moisture-removing material being effective as a coalescing material.

18. In a device as defined in claim 1, said moisture-removing material being a desiccant material.

* * * * *